United States Patent [19]

Kitoh et al.

[11] Patent Number: 4,460,535

[45] Date of Patent: Jul. 17, 1984

[54] METHOD FOR PRODUCING FLYBACK TRANSFORMERS

[75] Inventors: Makoto Kitoh, Yokohama; Tetsuo Tajima, Fujisawa; Noboru Terunuma; Noboru Mitsugi, both of Yokohama; Akira Kageyama, Hitachi, all of Japan

[73] Assignees: Hitachi, Ltd.; Hitachi Chemical Company, Ltd., both of Tokyo, Japan

[21] Appl. No.: 327,629

[22] Filed: Dec. 4, 1981

[30] Foreign Application Priority Data

Dec. 22, 1980 [JP] Japan ................. 55-180405

[51] Int. Cl.³ .................. B29C 6/00; B29D 31/00
[52] U.S. Cl. .................. 264/262; 264/272.11; 264/272.19
[58] Field of Search ............. 264/262, 272.19, 272.11, 264/272.2, 263; 156/332; 525/40

[56] References Cited

U.S. PATENT DOCUMENTS

| 2,801,945 | 8/1957 | Rogers et al. ............... 156/332 |
| 3,030,597 | 4/1962 | Piaia et al. ................. 264/272.19 |
| 3,208,894 | 9/1965 | Yanagihara et al. ........ 156/332 |
| 3,284,262 | 11/1966 | Dowling ..................... 156/332 |
| 3,456,224 | 7/1969 | Horstman .................... 336/96 |
| 3,937,855 | 2/1976 | Gruenwald ................. 264/272.2 |
| 4,212,790 | 7/1980 | Ibata et al. ................... 525/40 |
| 4,246,636 | 1/1981 | Kawamura et al. ......... 336/96 |

FOREIGN PATENT DOCUMENTS 2037087  7/1980  United Kingdom .......... 336/96

OTHER PUBLICATIONS

Whittington, Whittington's Dictionary of Plastics, Technomic Pub. Co., Stamford, Conn., 1975, p. 206.

Primary Examiner—Willard E. Hoag
Attorney, Agent, or Firm—Antonelli, Terry & Wands

[57] ABSTRACT

Good adhesion to cases or bobbins of flyback transformers is realized in the flyback transformers produced by insulation treatment with an unsaturated polyester resin adhesive.

13 Claims, 3 Drawing Figures

METHOD FOR PRODUCING FLYBACK TRANSFORMERS

BACKGROUND OF THE INVENTION

1. Field of the Invention

This invention relates to a method for producing flyback transformers (hereinafter shortened as FBT) which comprises insulation treatment of an FBT assembly employing bobbins and a case both of which were formed from a thermoplastic polyester resin, with an unsaturated polyester resin composition.

2. Brief Description of the Prior Art

FBTs used in TV sets are each constructed of components including a primary coil wound dividedly around a plastic bobbin having plural partition walls, a secondary coil wound dividedly around a plastic bobbin analogously to the primary coil with one or more diodes being wired, a plastic case, and condensers. These assembled components are made up through an insulation treatment to a finished FBT.

For this insulating material, unsaturated polyester resin compositions are favorably used, which are rapidly curable, of high productivity, and inexpensive, as compared with silicone resins, epoxy resins, etc. In this case, however, thermoplastic polyester resins such as poly(butylene terephthalate) and poly (ethylene terephthalate) which are almost insoluble in unsaturated polyester resin compositions, are used as bobbin or case material, and the conventional unsaturated polyester resin compositions are deficient in adhesiveness to these thermoplastic polyester resins, so that the unsaturated polyester resin compositions cast into FBT cases to insulate the electric parts contained therein is liable to peel from the cases or bobbin by effects of heat cycles and moisture absorption.

SUMMARY OF THE INVENTION

The object of the invention is to provide a method for producing FBTs by insulation treatment with an unsaturated polyester resin composition which is free from the disadvantages of the prior art and gives good adhesion between its hardened composition and the cases or bobbins of FBTs.

As a result of many elaborated studies in order to achieve the object, we have found that it is effective to use as the insulating material, an unsaturated polyester resin composition which contains an organic peroxide and a hardening accelerator in amounts of at least 0.2 and 0.01 part by weight, respectively, per 100 parts by weight of the unsaturated polyester resin.

The unsaturated polyester resin composition used for achieving the object of this invention contains an organic peroxide and a hardening accelerator in amounts of at least 0.2, preferably 3.5–15, parts by weight and at least 0.01, preferably 0.5–7, parts by weight, respectively, per 100 parts by weight of the resin. The organic peroxide contents higher than 15 parts by weight results in too short pot life, much heat generation during hardening, deterioration of heat- or crack-resistance of the hardened products, and high costs.

A marked improvement in the adhesion to the bobbin and cases of thermoplastic polyester resin when FBTs are subjected to insulation treatment with said unsaturated polyester resin composition is considered to be caused by production of free radicals from the organic peroxide in larger amounts than would be the case with no hardening accelerator, and by oxidation of the surface of bobbins and cases due to these free radicals.

The impregnation of the composition into the coils can be effected by adjusting the amount of hardening accelerator added or adding a polymerization inhibitor, without detracting adhesion characteristics of the composition.

Next, the materials used in this invention are explained.

The unsaturated polyester resin to be used in the invention can be prepared by reacting a polyhydric alcohol with polybasic acids composed of an unsaturated dibasic acid, a part of which may be substituted by a saturated dibasic acid, followed by adding a polymerizable monomer.

The unsaturated dibasic acids usable in this invention are maleic anhydride, maleic acid, fumaric acid, mesaconic acid, tetraconic acid, itaconic acid, chlorinated maleic acid, and dimethyl esters of these acids. They are used separately or in combination.

The saturated dibasic acids useable in this invention are phthalic acid, phthalic anhydride, isophthalic acid, terephthalic acid, tetrahydrophthalic acid, halogenated phthalic anhydride, succinic acid, adipic acid, and dimethyl esters of these acids. They are also used separately or in combination.

The polyhydric alcohols usable in this invention are ethylene glycol, diethylene glycol, propylene glycol, dipropylene glycol, butylene glycol, neopentyl glycol, hexamethylene glycol, hydrogenated bisphenol A, 2,2-di(4-hydroxypropoxyphenyl)propane, 2,2-di(4-hydroxyethoxyphenyl)propane, ethylene oxide, and propylene oxide. They are also used separately or in combination.

The polymerizable monomers usable in this invention include styrene, vinyltoluene, chlorostyrene, divinylbenzene, p-t-butylstyrene, diallyl phthalate, acrylic acid esters, and methacrylic acid esters. They are used separately or in combination.

The organic peroxides used in this invention include benzoyl peroxide, methyl ethyl ketone peroxide, t-butyl peroxybenzoate, t-butyl peroxyoctoate, t-butyl peroxy-2-ethylhexanoate, dicumyl peroxide, cumene hydroxyperoxide, and cyclohexanone peroxide. They are used separately or in combination.

The effective hardening accelerators used in this invention include cobalt naphthenate, magnanese naphthenate, lithium naphthenate, cobalt octanoate, tin octanoate, solutions of these compounds in solvents, aliphatic amines, and aromatic amines. Further, some additives such as anti-shrinking agents, coupling agents, flame retardants, colorants, fillers, etc. may be blended.

In the method for producing FBTs of this invention, a saturated polyester selected from poly(butylene terephthalate) and poly(ethylene terephthalate) is employed as a material of the bobbin and case. This saturated polyester may also contain filler, flame retardant, or colorant.

DETAILED DESCRIPTION OF THE INVENTION

This invention will be illustrated in more detail by the following examples: In the examples, "part" means part by weight.

EXAMPLE 1

In order to evaluate the adhesiveness between unsaturated polyester resin composition and poly(butylene terephthalate)(Planack ST-2030S, manufactured by Dainippon Ink and chemicals, Inc., was used), tensile adhesive strength was measured on 10 specimens for each sample composition in the following way and the mean values were determined.

An unsaturated polyester resin was prepared by adding, as flame retardants, 40 parts of aluminium hydroxide and 12 parts of red phosphorous and, as a filler, 70 parts of silica to an unsaturated polyester resin composed of 45 parts of a dicyclopentadiene-modified unsaturated alkyd resin, 49 parts of styrene monomer, and 6 parts of a polystyrene. Sample unsaturated polyester resin compositions were then prepared by adding benzoyl peroxide in different amounts of 1, 2, 3, 4, 5 and 8 parts with or without further adding cobalt naphthenate in amounts of respective one half the amounts of benzoyl peroxide, separately, to each 100 parts of said unsaturated polyester resin. Test pieces (11.3 mm diameter and 1 cm$^2$ bond area) made of said poly(butylene terephthalate) were bonded by using the sample unsaturated polyester resin compositions severally. The hardening conditions were 80° C.—3 hours plus 105° C.—3 hours, in the case of the compositions containing no cobalt naphthenate, and were 20° C.—15 hours plus 105° C.—3 hours, in the case of the compositions containing cobalt naphthenate.

Figure 2:
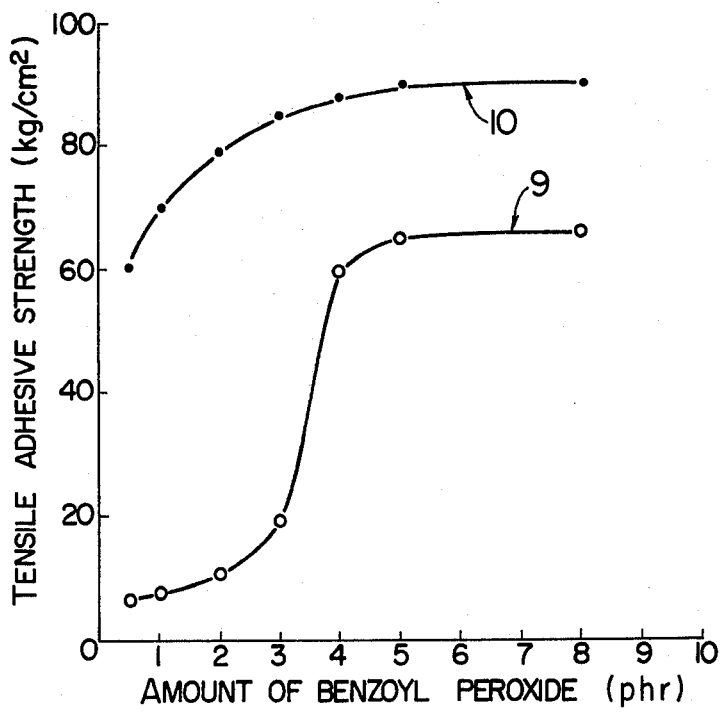
FIGS. 2 and 3 show the resulting adhesive strengths in Examples 1 and 2, respectively.

Measured values of tensile adhesive strength were shown in FIG. 2. While the compositions containing no cobalt naphthenate but more than 3.5 parts of benzoyl peroxide exhibit much high tensile adhesive strength as shown by curve 9, the composition containing cobalt naphthenate and more than 3.5 parts of benzoyl peroxide exhibit further high tensile adhesive strength as shown by curve 10.

Figure 1:
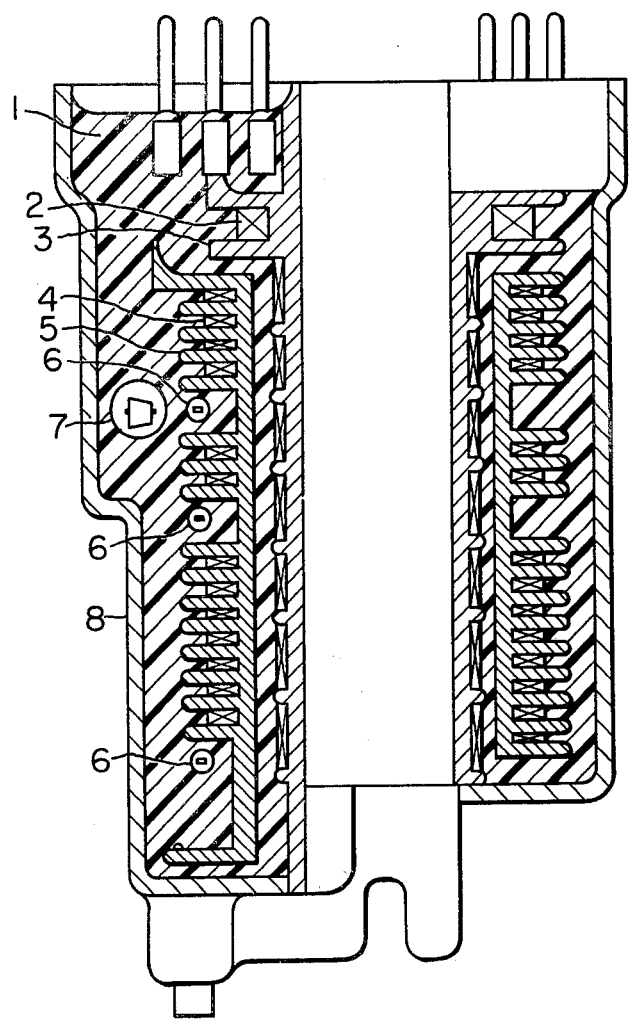
FIG. 1 is a sectional view of an FBT.

Secondly, the same compositions were poured each into the case 8 of an FBT of which sectional view shown in FIG. 1 constructed of components including a primary coil 2 wound dividedly around a plastic primary coil bobbin having plural partition walls 3, a secondary coil 4 wound dividedly around a plastic secondary coil bobbin 5 analogously to the primary coil with diodes 6 being wired, plastic case 8, condenser 7 and casting resin 1 which casts abovementioned assembled components, and hardened by heating under the same conditions as the above after the case had been evacuated to 10–20 torr for 10 minutes. FBTs insulation-treated with the compositions in this way were subjected to a heat cycle test of 60 times repetition of cooling to −50° C. for 2 hours and heating to 100° C. for 2 hours. Results of subsequent running tests and of appearance tests of the dismantled FBTs showed that the compositions containing cobalt naphthenate and 2 PHR or more of benzoyl peroxide caused neither bond disruption between the case or bobbin and the hardened composition nor corona discharge.

EXAMPLE 2

An unsaturated polyester resin was prepared by adding, as flame retardants, 40 parts of aluminium hydroxide and 12 parts of red phosphorous and, as a filler, 70 parts of silica to an unsaturated polyester resin composed of 49 parts of an unsaturated alkyd resin prepared by reacting isophthalic acid, propylene glycol, and maleic anhydride and 51 parts of styrene monomer. Sample unsaturated polyester resin compositions were then prepared by adding t-butyl peroxy-2-ethylhexanoate in different amounts of 0.5, 1, 2, 3, 4, 5, 6, 8 and 10 parts with or without further adding tin octanoate in amounts of 0.5 and 1.0 part, separately to each 100 parts of said polyester resin. Test pieces for tensile adhesive strength (11.3 mm diameter and 1 cm$^2$ bond area) made of a poly(ethylene terephthalate)(WNN-1030, manufactured by Teijin Ltd.) were bonded by using the sample unsaturated polyester resin compositions severally. The hardening conditions were 80° C.—3 hours plus 105° C.—3 hours, in the case of the compositions containing no tin octanoate, and 20° C.—15 hours plus 105° C.—3 hours, in the case of the compositions containing tin octanoate.

Figure 3:
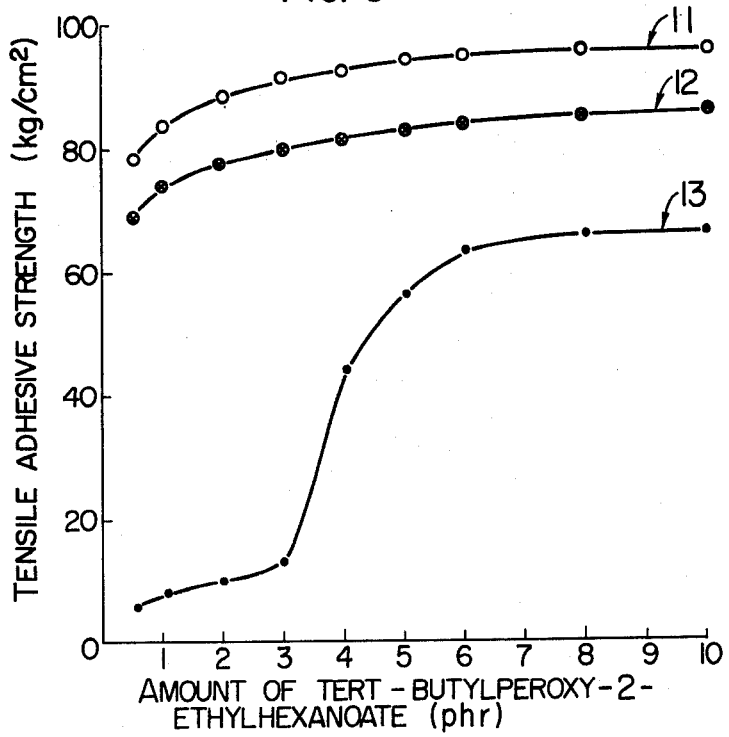

Measured values of tensile adhesive strength were shown in FIG. 3. The compositions containing 0.5 and 1.0 part of tin octanoate (curves 11 and 12) exhibit higher adhesive strength than those containing no tin octoate (curve 13).

Then, the same heat cycle tests, running tests, and appearance tests as in Example 1 were conducted by using these unsaturated polyester resin compositions. The compositions containing tin octanoate caused neither bond disruption nor corona discharge.

What is claimed is:

1. A method for producing flyback transformers which comprises subjecting a flyback transformer assembly, employing bobbins and a case made of poly(butylene terephthalate) or poly(ethylene terephthalate), to insulation treatment with an unsaturated polyester resin composition comprising 100 parts by weight of an unsaturated polyester resin and more than 6 parts by weight of an organic peroxide which is selected from the group consisting of benzoyl peroxide, t-butyl peroxybenzoate, t-butyl peroxyoctoate, t-butyl peroxy-2-ethylhexanoate, dicumyl peroxide and cumene hydroxyperoxide, said unsaturated polyester resin comprising: (a) an unsaturated polyester prepared by reacting a polyhydric alcohol with a polybasic acid composed of an unsaturated dibasic acid, a part of which may be substituted by a saturated dibasic acid and (b) a polymerizable monomer, whereby good adhesion between the hardened composition of said unsaturated polyester resin composition, and the bobbins and case, is achieved, said insulation treatment including encapsulating said bobbin in said case with said polyester resin composition.

2. A method for producing flyback transformers of claim 1 wherein said resin composition comprises at least 8 parts by weight of an organic peroxide.

3. A method for producing flyback transformers of claim 1 wherein the unsaturated polyester resin composition further comprises an accelerator.

4. A method for producing flyback transformers of claim 3 wherein the accelerator is included in an amount of at least 0.01 part by weight.

5. A method for producing flyback transformers of claim 1 or 3, the resin of said composition consisting of an unsaturated polyester resin.

6. A method for producing flyback transformers of claim 1 or 15 wherein said polyhydric alcohol is at least one selected from the group consisting of ethylene glycol, diethylene glycol, propylene glycol, dipropylene glycol, butylene glycol, neopentyl glycol, hexamethylene glycol, hydrogenated bisphenol A, 2,2-di(4-hydroxypropoxyphenyl) propane, ethylene oxide and propylene oxide.

7. A method for producing flyback transformers of claim 6 wherein said unsaturated dibasic acid is at least one selected from the group consisting of maleic anhydride, maleic acid, fumaric acid, mesaconic acid, tetraconic acid, itaconic acid, chlorinated maleic acid and dimethyl esters thereof.

8. A method for producing flyback transformers of claim 7 wherein said saturated dibasic acid is at least one selected from the group consisting of phthalic acid, phthalic anhydride, isophthalic acid, terephthalic acid, tetrahydrophthalic acid, halogenated phthalic anhydride, succinic acid, adipic acid, and dimethyl esters thereof.

9. A method for producing flyback transformers of claim 8 wherein said polymerizable monomer is at least one selected from the group consisting of styrene, vinyltoluene, chlorostyrene, divinylbenzene, p-t-butylstyrene, diallyl phthalate, acrylic acid esters and methacrylic acid esters.

10. A method for producing flyback transformers of claim 1 wherein said thermosetting resin composition comprises 100 parts by weight of an unsaturated polyester resin and more than 6 parts, but not more than 15, parts by weight of an organic peroxide.

11. A method for producing flyback transformers of claim 10 wherein the unsaturated polyester resin composition further comprises an accelerator.

12. A method for producing flyback transformers of claim 11 wherein the accelerator is included in an amount of 0.5 to 7 parts by weight.

13. A method for producing flyback transformers of claim 3 or 11 wherein said accelerator is selected from the group consisting of cobalt naphthenate, manganese naphthenate, lithium naphthenate, cobalt octanoate and tin octanoate.

* * * * *